Figure 1:
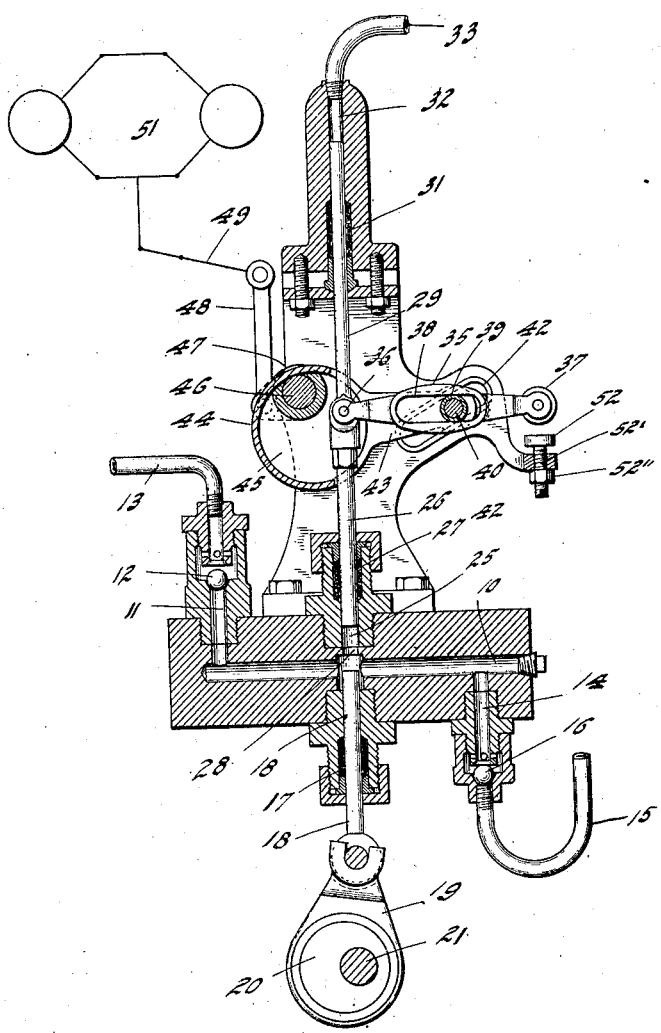

N. McCARTY.
GOVERNED PUMP.
APPLICATION FILED DEC. 18, 1908.

929,100.

Patented July 27, 1909.
3 SHEETS—SHEET 2.

Witnesses
Frank A. Fahle
Thomas W. McMeans

Inventor
Norman McCarty,
By Bradford Hood
Attorneys

N. McCARTY.
GOVERNED PUMP.
APPLICATION FILED DEC. 18, 1908.

929,100.

Patented July 27, 1909.
3 SHEETS—SHEET 3.

Witnesses
Frank A. Fahle
Thomas W. McMeans

Inventor
Norman McCarty,
By Bradford Hood
Attorneys

UNITED STATES PATENT OFFICE.

NORMAN McCARTY, OF INDIANAPOLIS, INDIANA, ASSIGNOR TO ATLAS ENGINE WORKS, OF INDIANAPOLIS, INDIANA, A CORPORATION OF INDIANA.

GOVERNED PUMP.

No. 929,100.   Specification of Letters Patent.   Patented July 27, 1909.

Application filed December 18, 1908. Serial No. 468,167.

*To all whom it may concern:*

Be it known that I, NORMAN McCARTY, a citizen of the United States, residing at Indianapolis, in the county of Marion and State of Indiana, have invented certain new and useful Improvements in Governed Pumps, of which the following is a specification.

In that class of internal combustion motors in which the liquid fuel is introduced into the combustion chamber after there has been sufficient compression of an initial air charge to raise such air charge to a temperature high enough to ignite the injected fuel, it has been found that the only practical means of controlling the speed of the motor is by accurately measuring each injected volume of fuel. The importance and extreme delicacy of properly regulating the supply of the fuel will be appreciated from the fact that, with a 100 H. P. motor, each power stroke of the piston does not require far from three-tenths of a cubic inch of fuel when a full load is being carried. As a consequence a comparatively small variation in the quantity of fuel will produce a considerable difference in developed power and speed.

The object of my present invention is, therefore, to produce a governed pump mechanism especially adapted for delivering fuel to such motors in accurately measured quantities, the measuring being accomplished by a mechanism which is under the control of a speed controlled governor driven by the motor.

A further object of my invention is to provide a governing or measuring mechanism which will be very sensitive; which will have a comparatively large range of movement for a comparatively small movement of the speed controlled governor; and will be of such character that forces, acting thereon by reason of the movement of the fuel ejecting members, will not be transmitted to the speed controlled governor in such way as to materially alter the action of the parts of the speed controlled governor, thereby eliminating that objectionable jumping of the speed controlled governor which is now common in all of the fuel delivering mechanisms with which I am acquainted.

Commercially it will many times be desirable to equip a small-power motor with a pump of standard construction having a capacity sufficient to supply a motor of considerably higher power, without material change in the construction of the pump, especially as to the controlling mechanism. The desired result may be attained by providing means for preventing the suction valve from closing until after a predetermined portion of the displacing stroke of the displacing piston has been accomplished, thus permitting, at each stroke, a limited back flow to the supply reservoir, such back flow being constant, but non-automatically adjustable within the short limit.

A further object of my invention is, therefore, to produce a mechanism which may be readily associated with the suction valve of accomplish the desired result.

The accompanying drawings illustrate satisfactory forms of my invention.

Figure 2:
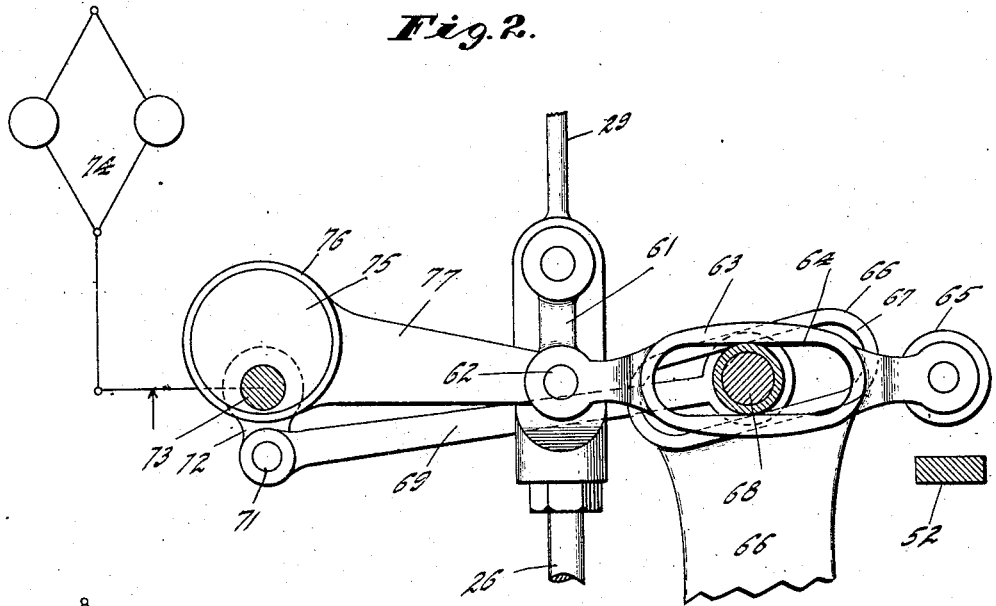
Figure 3:
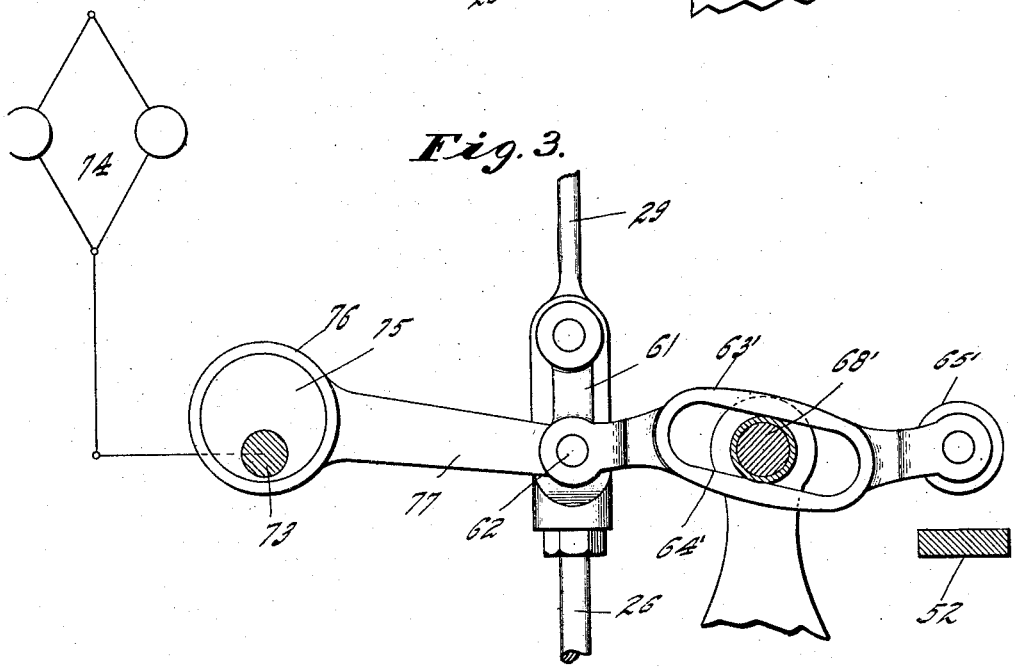
Figures 4, 5:
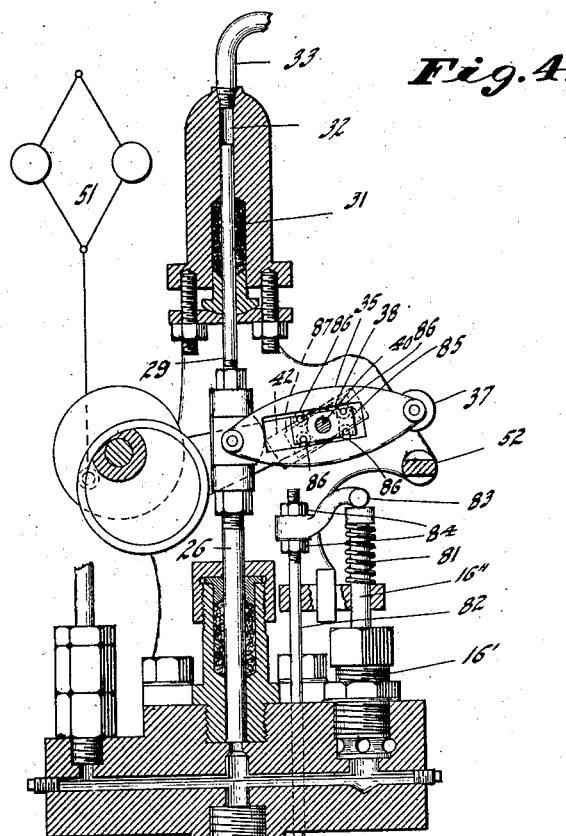

Figure 1 is a vertical section of a governed pump constructed in accordance with my invention, the speed controlled governor being shown diagrammatically in connection therewith; Fig. 2 a fragmentary detail of a modification of the adjusting mechanism for the measurer; Fig. 3 a similar fragmentary detail of another modification. Fig. 4 a vertical section of a modification having a suction-valve operator, and Fig. 5 a detail of an automatically adjustable stop modification.

In the drawings, 10 indicates a pump chamber having a discharge passage 11 in which is mounted a check valve 12 which prevents back flow from the pipe 13 which leads to the atomizer or other receiving mechanism (not shown) within which is constantly maintained a considerable pressure. Leading into pump chamber 10 is an inlet passage 14 which communicates with a supply pipe 15 leading from a fuel reservoir (not shown) preferably a little higher than the pump chamber 10 so that fuel will flow by gravity into the pump chamber. A check valve 16 is arranged between pipe 15 and passage 14 so as to prevent any back flow from the pump chamber 10 into pipe 15. Extended into the pump chamber 10 through a suitable packing gland 17, is a displacement piston 18 the outer end of which is connected to any suitable operating mechanism operating in synchronism with the motor piston (when the pump is used for the purpose for which it is especially designed). In the present case I have shown such operating mechanism as consisting of an eccentric-arm, or strap, 19 carried by an eccentric 20 on a shaft 21 driven in synchronism with the motor. An inward or displacing movement of the piston 18 will cause a displacement equal to the maximum volume of fuel to be delivered by the pump on a single stroke and this displacing movement is constant.

In order to vary the amount of discharge from the pump, while at the same time maintaining a uniform and unvarying displacement action of the piston, I provide means for enlarging, to a greater or less extent, the capacity of the pump chamber, subsequent to a recharging of the pump chamber from the supply reservoir but contemporaneous with or precedent to the discharging or displacing movement of the piston. In other words,—the pump chamber is initially of a certain volume capable of receiving such quantity of fuel that a displacing movement of the piston may cause a discharge of a maximum quantity of fuel; then, after charging and on or before the complete displacing movement of the piston, the capacity of the pump chamber is enlarged a greater or less extent thus compensating all or a portion of the displacement of the discharging piston and thus diminishing to a greater or less extent the volume of discharge.

It is obvious, from what has been said, that a considerable variety of mechanism might be devised to accomplish the results defined and in the present drawings I have shown a construction which, with my present information, I believe to be as simple and effective as necessary.

Communicating with the pump chamber 10 is a passage 25 within which is mounted a compensating piston 26 which passes through a suitable packing gland 27. The piston 26 is yieldingly held against a shoulder 28 by any suitable means so as to give the pump chamber 10 a fixed initial or receiving capacity. Any suitable means may be provided to yieldingly hold the piston 26 in normal position and in the present drawings I have shown, for this purpose, the piston 26 provided at its upper end with a smaller piston portion 29 which passes through a suitable packing gland 31 and enters a pressure chamber 32 supplied through a suitable pipe 33 with the adequate pressure not only to yieldingly urge piston 26 to its normal position but to do so under such pressure as to insure the seating of valve 16. So far as the present structure is concerned it will be readily understood that any yielding means other than that shown might be used to accomplish the downward movement of piston 26 and permit its upward movement. The total upward movement of piston 26 must be sufficient to compensate the displacement of piston 18 when it is projected to its full extent into the pump chamber 10 and in the present drawings I have shown the two pistons 18 and 26 of the same diameter and consequently the maximum vertical movement of the piston 26 will be equal to the uniform vertical movement of piston 18. Manifestly, whenever an upward movement of piston 26 is such that the capacity of chamber 10 is increased by an amount exactly equal to the displacement caused by the upward movement of piston 18, there will be no possibility of discharge past the valve 12 and, if there be no upward movement of piston 26, the discharge past valve 12 will be equal to the displacement of piston 18, while any arrestment of the upward movement of piston 26 at an intermediate point will accurately determine the amount of discharge, between maximum and minimum, from the pump.

Many suitable mechanisms, controllable by means of a speed controlled governor, may be provided to arrest the upward movement of piston 26 but, in order to obtain the highest degree of efficiency of the governing mechanism, such controlling mechanism should be of such character that the forces applied thereto shall be available to as little an extent as possible in resisting the action of the governor in one direction and should also be of such character as to prevent an exertion of any force upon the speed controlled governor in the direction of the action of its controlling springs, so as to prevent any "jumping" of the speed controlled governor.

In order to accomplish the various results above defined any one of the constructions shown in the drawings may be adopted with almost the same degree of efficiency.

In the form shown in Fig. 1 a lever 35 is pivoted at 36 to piston 26 and is provided at its outer end with a roller 37. Formed in lever 35 is a longitudinal slot 38 which receives a roller 39 carried by a fulcrum pin 40 mounted in a stationary guideway 42 formed in the main frame of the structure. Pin 40 is connected to an eccentric arm 43 which carries a strap 44 embracing an eccentric 45 carried by a rock shaft 46 having the arm 47 connected by a link 48 and lever 49 with a speed controlled governor 51, the arrangement being such that a movement of the collar of the speed controlled governor will cause a rocking of shaft 46 so as to produce a sliding movement of fulcrum 40 in guide 42, thus shifting the fulcrum 40 of lever 35 and at the same time raising roller 37 from, or lowering said roller toward, a fixed stop 52 arranged in the path of movement of the roller. Stop 52 may, of course, be adjustable within a reasonable range by means of screw 52′ and check nut 52″. With the parts in the positions shown in Fig. 1 the speed controlled governor is in the position assumed at the governing speed and consequently fulcrum 40 is at one end of its range of movement and roller 37 will not come into engagement with the fixed stop 52 until the completion of the displacement stroke of piston 18, at which time piston 26 has been given its complete upward movement (by the upward movement of piston 18) and there has been, therefore, no discharge from the pump. By rocking the eccentric 45 to the left, fulcrum 40 will be drawn to the left so that roller 37 will come into contact with the fixed stop 52 at some time prior to the completion of the upward, or displacing, stroke of piston 18 and, as soon as this occurs, lever 35, having two fixed points of support, i. e., the fulcrum 40 and stop 52, is prevented from any further upward movement and continuous upward movement of the piston 18 will cause a discharge of liquid from the pump chamber past valve 12.

It will be noticed that, as the fulcrum 40 is moved to the left (Fig. 1) there is not only a change of ratio of the arms of the lever 35, in the direction of increase of sensitiveness but at the same time, due to the inclination of guide 42 from the line of slot 38, the distance between roller 37 and stop 52 is also adjusted so that a very slight movement of the speed controlled governor will serve to produce a very decided effect upon the capability of movement of the piston 26. It will also be noticed that the direction of force upon fulcrum 40, which may be applied thereto by plunger 26 through the medium of lever 35, is such that that force will not be successfully transmitted to the speed controlled governor in any way tending to assist the spring of the speed controlled governor to pull the balls together and thus tend to produce "racing".

As has been previously stated, a number of modifications of the connection between the speed controlled governor and the piston 26 may be made without departing from my invention.

In Fig. 2 a link 61 is pivoted at one end to piston 26 and at the other end is pivoted at 62 to a lever 63 which has an intermediate slot 64 and a roller 65 at its outer end. Mounted alongside the lever 63 is a standard 66 within which is mounted a guide 67 the inclination of which is preferably equal to the inclination of lever 63 when plunger 26 is at its lowest point of movement. Movably mounted in guide 67 is a fulcrum 68 which projects into slot 64. Connected with fulcrum 68 is a link 69 which is connected at 71 to an arm 72 carried by a rock shaft 73 which, in turn, is connected to the speed controlled governor 74. Secured to rock shaft 73 is an eccentric 75 and mounted on this eccentric is a strap 76 having an arm 77 pivoted at 62 to link 61 and lever 63. It will be seen that, by this arrangement there is a further sensitizing because, as the fulcrum moves in one direction relative to the lever, the lever moves in the opposite direction and the fulcrum also moves downward as it moves toward the left thus causing a downward movement of roller 65 toward the fixed stop 52. It will be noticed, that, by making the guide 67 at an angle equal to the angle of lever 63 when the piston 26 is at its normal position, the fulcrum 68 can be moved in the guide 67 with practically no resistance due to any pressures upon piston 26.

In Fig. 3 I show a construction in which the lever is movable and the fulcrum fixed. In that form the piston 26 has pivoted thereto a link 61 to which is pivoted an arm 77 of an eccentric strap 76 around the eccentric 75 of rock shaft 73. The lever 63' is similar to lever 63 (Fig. 2) and is provided with a slot 64' and the wheel 65' at its outer end to coöperate with the fixed stop 52. The fulcrum 68' is a fixed fulcrum and consequently the angle of inclination of slot 64' is opposite to the inclination of slot 67 of guide 66 in order that, as the wheel end of the lever is lengthened the wheel will simultaneously be moved toward the fixed stop 52.

In Fig. 4 the construction corresponds in great measure to the construction shown in Fig. 1 and I shall not give any detailed description, except of the modified or additional parts. Instead of the admission valve 16 shown in Fig. 1, I provide an admission valve 16' provided with a stem 16" which projects through a suitable packing gland and is provided with a spring 81 which normally tends to close the valve. If the maximum outflow of the apparatus is desired no attempt is made to interfere in any manner with the operation of spring 81 on the suction valve but if the maximum output of the pump exceeds any possible demand I provide a rod 82 which, at its lower end, is connected to the displacing piston 18 so as to partake of the movement of said piston. At its upper end, rod 82 is provided with a finger 83 arranged to be brought into engagement with the stem of the suction valve 16' in a direction to open said valve in opposition to spring 81, and said finger 83 is adjustable lengthwise of the movement of the suction valve, by means of nuts 84 84 threaded upon rod 82. In Fig. 4 the parts are shown in the positions which would be occupied on the down or suction stroke of the piston 18. At this time finger 83 has just come into engagement with stem 16" so that further movement of shaft 21 in the direction indicated by the arrow will insure an opening of the suction valve if it has not already been unseated by the suction. When shaft 21 is moved approximately 180° from the position shown, piston 18 will have again arrived at the position which it is shown to occupy and during all of this time the suction valve will have been held open by finger 83 so that the upward movement of piston 18 has caused a back flow from the pump chamber i o the supply reservoir past valve 16' and there has been no movement of the compensating piston 26. Any further movement of the shaft 21 however will carry finger 83 away from the stem of valve 16' and the further operation will be exactly as has been defined in connection with Fig. 1. In place of the simple fulcrum 40 in Fig. 1, I have mounted upon said fulcrum a head 85 which carries rollers 86 which lie within the slot 38 of the lever 35, and have also shown a similar head 87 which is also mounted on the fulcrum 40 and lies within the slot 42 of the stationary guide. This construction is the substantial equivalent of the construction shown in the other figures merely eliminating the friction to some degree.

In Fig. 5 the lever 91 is connected at 92 to piston 26 and is provided with a fixed fulcrum 93. The lever 91 is limited in its movement in one direction by means of a stop 94 movably mounted in a guide 95 and connected by arm 96 and eccentric strap 97 with an eccentric 45 carried by a rock shaft 46 adapted to be connected to a speed controlled governor, as in the other forms.

I claim as my invention:—

1. The combination, with a pump-chamber having an inlet, an outlet, and means for checking flow from the pump-chamber through the inlet and from the outlet into the chamber, of a displacement member associated with the pump-chamber to decrease and increase the capacity thereof, a compensating member associated with the pump-chamber and movable to increase the capacity of the chamber as the displacement member decreases the capacity of the same, means for driving said compensating member to its innermost position, and means for variably controlling the movement of the compensating member.

2. In an apparatus for delivering variable quantities of fuel to an internal combustion motor, a pump having a fuel inlet, and a fuel outlet leading to the motor, of means for variably enlarging the capacity of the pump subsequent to the introduction of a fuel charge thereinto, means for returning said capacity-enlarging means to initial position and speed controlled means connected to the motor and controlling said enlarging means.

3. In an apparatus for supplying variable quantities of fuel under pressure to an internal combustion motor, the combination of a pump delivering under pressure, means for enlarging the capacity of said pump subsequent to the receipt of a charge of fuel, controlling means for variably limiting the capacity-enlarging action of said means, means for normally returning the capacity-enlarging means to normal a speed controlled governor, and intermediate connections between said speed controlled governor and said limiting means controlling the action thereof.

4. In an apparatus for supplying variable quantities of fuel under pressure to an internal combustion motor, the combination of a pump delivering under pressure, means for enlarging the capacity of said pump subsequent to the receipt of a charge of fuel, a controlling lever engaging said capacity-enlarging means, a fulcrum for said lever, means, adapted to be connected to a speed controlled governor, for varying the relation between the lever and its fulcrum, and means coöperating with the lever to limit the movement thereof and thereby limit the capacity-enlarging movement of the capacity-enlarging means.

5. In an apparatus for supplying variable quantities of fuel under pressure to an internal combustion motor, the combination of a pump delivering under pressure, means for enlarging the capacity of said pump subsequent to the receipt of a charge of fuel, a controlling lever engaging said capacity-enlarging means, a fulcrum for said lever, means, adapted to be connected to a speed controlled governor, for shifting the fulcrum relative to the lever to vary the relation of the arms thereof, and means to limit the movement of the lever on its fulcrum in one direction.

6. The combination, with a pump chamber having an inlet and an outlet and means for preventing back flow from the chamber to the inlet and from the outlet to the chamber, of a displacing piston projectable into said chamber, a compensating piston also projectable into said chamber, means for projecting said compensating piston into said chamber means for reciprocating the displacing piston relative to the chamber, and means for variably controlling the reciprocation of the compensating piston in coöperation with the displacing piston.

7. The combination, with a pump chamber having an inlet and an outlet and means for preventing back flow from the chamber to the inlet and from the outlet to the chamber, of a displacing piston projectable into said chamber, a compensating piston also projectable into said chamber, means for projecting said compensating piston into said chamber, means for reciprocating the displacing piston relative to the chamber, a controlling lever connected to the compensating piston, means for limiting the throw of said lever to limit the throw of the compensating piston in one direction, and means for automatically varying the limitation of the controlling lever.

8. The combination, with a pump chamber having an inlet and an outlet and means for preventing back flow from the chamber to the inlet and from the outlet to the chamber, of a displacing piston projectable into said chamber, a compensating piston also projectable into said chamber, means for projecting said compensating piston into said chamber means for reciprocating the displacing piston relative to the chamber, a controlling lever connected to the compensating piston, means for limiting the throw of said lever to limit the throw of the compensating piston in one direction, and means for varying the relation of the arms of said lever to vary the limit of movement of said lever.

9. The combination, with a pump chamber having an inlet and an outlet and means for preventing back flow from the chamber to the inlet and from the outlet to the chamber, of a displacing piston projectable into said chamber, a compensating piston also projectable into said chamber, means for projecting said compensating piston into said chamber means for reciprocating the displacing piston relative to the chamber, means for yieldingly urging the compensating piston to a normal position, means for holding said compensating piston against yield, and means, adapted to be connected to a speed controlled governor, for variably adjusting said limiting means.

10. The combination, with a pump chamber having an inlet and an outlet and means for preventing back flow from the chamber to the inlet and from the outlet to the chamber, of a displacing piston projectable into said chamber, a compensating piston also projectable into said chamber, means for projecting said compensating piston into said chamber means for reciprocating the displacing piston relative to the chamber, means for yieldingly urging the compensating piston to a normal position, a lever engaging said compensating piston, means for limiting the throw of said lever in one direction, and means for adjusting the said lever relative to its limiting means.

11. The combination, with a pump chamber having an inlet and an outlet and means for preventing back flow from the chamber to the inlet and from the outlet to the chamber, of a displacing piston projectable into said chamber, a compensating piston also projectable into said chamber, means for projecting said compensating piston into said chamber means for reciprocating the displacing piston relative to the chamber, means for yieldingly urging the compensating piston to a normal position, a lever engaging said compensating piston, means for limiting the throw of said lever in one direction, and means for varying the relation between the said lever and its fulcrum to vary the lever ratio relative to the lever limiting means.

12. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, means for yieldingly urging the compensating piston to a normal position, a lever engaging said compensating piston, means for limiting the throw of said lever in one direction, and means for varying the relation between the said lever and its fulcrum to vary the lever ratio relative to the lever limiting means and for moving said lever toward or from said limiting means.

13. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, means for yieldingly urging the compensating piston to a normal position, a controlling lever engaging said compensating piston, means for limiting the throw of said lever in one direction, an eccentric adapted to be shifted by a speed controlled governor, and means coöperating with said eccentric for varying the lever ratio.

14. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, means for yieldingly urging the compensating piston to a normal position, a controlling lever engaging said compensating piston, means for limiting the throw of said lever in one direction, an eccentric adapted to be shifted by a speed controlled governor, and means coöperating with said eccentric for varying the lever ratio and moving the same toward or from the lever limiting means.

15. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, means for yieldingly urging the compensating piston to a normal position, a controlling lever engaging said compensating piston, means for limiting the throw of said lever in one direction, an eccentric adapted to be shifted by a speed controlled governor, and means coöperating with said eccentric for shifting the fulcrum of said lever longitudinally thereof.

16. The combination, with a pump chamber having an inlet and an outlet and means for preventing back flow from the chamber to the inlet and from the outlet to the chamber, of a displacing piston projecting into said chamber, a compensating piston also projectable into said chamber, means for reciprocating the displacing piston relative to the chamber, means for yieldingly urging the compensating piston to a normal position, a controlling lever engaging said compensating piston, means for limiting the throw of said lever in one direction, an eccentric adapted to be shifted by a speed controlled governor, and means coöperating with said eccentric for shifting the fulcrum of said lever longitudinally thereof and also transversely to shift the lever toward and from its limiting means.

17. The combination, with a pump-chamber having an inlet, an outlet, and means for checking flow from the pump-chamber through the inlet and from the outlet into the chamber, of a displacement member associated with the pump chamber to decrease and increase the capacity thereof, a compensating member associated with the pump-chamber and movable to increase the capacity of the chamber as the displacement member decreases the capacity of the same, means for moving said compensating member to decrease the capacity of the chamber, means for variably controlling the movement of the compensating member, and means operated by the displacement member for controlling the checking means of the pump-chamber inlet.

18. In an apparatus for supplying variable quantities of fuel under pressure to an internal combustion motor, the combination of a pump delivering under pressure, means for enlarging the capacity of said pump subsequent to the receipt of a charge of fuel, controlling means for variably limiting the capacity-enlarging action of said means, means for driving said capacity-enlarging means to its normal position, a speed controlled governor, and intermediate connections between said speed controlled governor and said limiting means controlling the action thereof, and means permitting a back flow from the pump during a predeterminable portion of the operation of the pump.

19. In an apparatus for supplying variable quantities of fuel under pressure to an internal combustion motor, the combination of a pump delivering under pressure, means for enlarging the capacity of said pump subsequent to the receipt of a charge of fuel, means for driving said capacity-enlarging means to its normal position, a controlling lever engaging said capacity-enlarging means, a fulcrum for said lever, means, adapted to be connected to a speed controlled governor, for varying the relation between the lever and its fulcrum, means coöperating with the lever to limit the movement thereof and thereby limit the capacity-enlarging movement of the capacity-enlarging means, and means permitting a back flow from the pump during a predeterminable portion of the operation of the pump.

20. In an apparatus for supplying variable quantities of fuel under pressure to an internal combustion motor, the combination of a pump delivering under pressure, means for enlarging the capacity of said pump subsequent to the receipt of a charge of fuel, a controlling lever engaging said capacity-enlarging means, a fulcrum for said lever, means, adapted to be connected to a speed controlled governor, for shifting the fulcrum relative to the lever to vary the relation of the arms thereof, means to limit the movement of the lever on its fulcrum in one direction, and means permitting a back flow from the pump during a predeterminable portion of the operation of the pump.

21. The combination, with a pump chamber having an inlet and an outlet and means for preventing back flow from the chamber to the inlet and from the outlet to the chamber, of a displacing piston projectable into said chamber, a compensating piston also projectable into said chamber, means for projecting said compensating piston into said chamber, means for reciprocating the displacing piston relative to the chamber, means for variably controlling the reciprocation of the compensating piston in coöperation with the displacing piston, and means connected with the displacing piston for holding open the means preventing back flow to the inlet during a predeterminable portion of the displacing stroke of the displacing piston.

22. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, a controlling lever connected to the compensating piston, means for limiting the throw of said lever to limit the throw of the compensating piston in one direction, means for automatically varying the limitation of the controlling lever, and means connected with the displacing piston for holding open the means preventing back flow to the inlet during a predeterminable portion of the displacing stroke of the displacing piston.

23. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, a controlling lever connected to the compensating piston, means for limiting the throw of said lever to limit the throw of the compensating piston in one direction, means for varying the relation of the arms of said lever to vary the limit of movement of said lever, and means connected with the displacing piston for holding open the means preventing back flow to the inlet during a predeterminable portion of the displacing stroke of the displacing piston.

24. The combination, with a pump chamber having an inlet and an outlet and means for preventing back flow from the chamber to the inlet and from the outlet to the chamber, of a displacing piston projectable into said chamber, a compensating piston also projectable into said chamber, means for projecting said compensating piston into said chamber, means for reciprocating the displacing piston relative to the chamber, means for yieldingly urging the compensating piston to a normal position, means for holding said compensating piston against yield, means, adapted to be connected to a speed controlled governor, for variably adjusting said limiting means, and means connected with the displacing piston for holding open the means preventing back flow to the inlet during a predeterminable portion of the displacing stroke of the displacing piston.

25. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, means for yieldingly urging the compensating piston to a normal position, a lever engaging said compensating piston, means for limiting the throw of said lever in one direction, means for adjusting the said lever relative to its limiting means, and means connected with the displacing piston for holding open the means preventing back flow to the inlet during a predeterminable portion of the displacing stroke of the displacing piston.

26. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, means for yieldingly urging the compensating piston to a normal position, a lever engaging said compensating piston, means for limiting the throw of said lever in one direction, means for varying the relation between the said lever and its fulcrum to vary the lever ratio relative to the lever limiting means, and means connected with the displacing piston for holding open the means preventing back flow to the inlet during a predeterminable portion of the displacing stroke of the displacing piston.

27. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, means for yieldingly urging the compensating piston to a normal position, a lever engaging said compensating piston, means for limiting the throw of said lever in one direction, means for varying the relation between the said lever and its fulcrum to vary the lever ratio relative to the lever limiting means and for moving said lever toward or from said limiting means, and means connected with the displacing piston for holding open the means preventing back flow to the inlet during a predeterminable portion of the displacing stroke of the displacing piston.

28. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, means for yieldingly urging the compensating piston to a normal position, a controlling lever engaging said compensating piston, means for limiting the throw of said lever in one direction, an eccentric adapted to be shifted by a speed controlled governor, means coöperating with said eccentric for varying the lever ratio, and means connected with the displacing piston for holding open the means preventing back flow to the inlet during a predeterminable portion of the displacing stroke of the displacing piston.

29. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, means for yieldingly urging the compensating piston to a normal position, a controlling lever engaging said compensating piston, means for limiting the throw of said lever in one direction, an eccentric adapted to be shifted by a speed controlled governor, means coöperating with said eccentric for varying the lever ratio and moving the same toward or from the lever limiting means, and means connected with the displacing piston for holding open the means preventing back flow to the inlet during a predeterminable portion of the displacing stroke of the displacing piston.

30. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, means for yieldingly urging the compensating piston to a normal position, a controlling lever engaging said compensating piston, means for limiting the throw of said lever in one direction, an eccentric adapted to be shifted by a speed controlled governor, means coöperating with said eccentric for shifting the fulcrum of said lever longitudinally thereof, and means connected with the displacing piston for holding open the means preventing back flow to the inlet during a predeterminable portion of the displacing stroke of the displacing piston.

31. The combination, with a pump chamber having an inlet and an outlet and means for preventing back flow from the chamber to the inlet and from the outlet to the chamber, of a displacing piston projectable into said chamber, a compensating piston also projectable into said chamber, means for reciprocating the displacing piston relative to the chamber, means for yieldingly urging the compensating piston to a normal position, a controlling lever engaging said compensating piston, means for limiting the throw of said lever in one direction, an eccentric adapted to be shifted by a speed controlled governor, means coöperating with said eccentric for shifting the fulcrum of said lever longitudinally thereof and also transversely to shift the lever toward and from its limiting means, and means connected with the displacing piston for holding open the means preventing back flow to the inlet during a predeterminable portion of the displacing stroke of the displacing piston.

32. The combination, with a pump chamber having an inlet valve and an outlet valve, of a displacing member associated with said pump chamber to decrease the capacity thereof and eject material therefrom, a compensating member also associated with said chamber to vary the capacity thereof, means for driving said compensating member to its innermost position, and means for variably controlling the capacity enlarging movement of said compensating member with relation to the pump chamber.

33. In an apparatus for delivering variable quantities of fuel to an internal combustion member, a pump having a fuel inlet, a fuel outlet leading to the motor, and means for ejecting fuel through the outlet, of means for varying the capacity of the pump relative to the ejecting means, means for yieldingly urging said capacity-varying means to normal, and speed controlled means connected to the motor and controlling said capacity-controlling means.

In witness whereof, I, have hereunto set my hand and seal at Indianapolis, Indiana, this third day of December, A. D. one thousand nine hundred and eight.

NORMAN McCARTY. [L. S.]

Witnesses:
ARTHUR M. HOOD,
THOMAS W. McMEANS.